Sept. 18, 1962      H. J. WHITE      3,054,553
ELECTROSTATIC BLOWER APPARATUS
Filed Aug. 11, 1959      2 Sheets-Sheet 1

INVENTOR
HARRY J. WHITE
BY Harold T. Stowell
Harold L. Stowell
ATTORNEYS

INVENTOR
HARRY J. WHITE

United States Patent Office 3,054,553
Patented Sept. 18, 1962

3,054,553
ELECTROSTATIC BLOWER APPARATUS
Harry J. White, Basking Ridge, N.J., assignor to Research-Cottrell, Inc., Bridgewater Township, Somerset County, N.J., a corporation of New Jersey
Filed Aug. 11, 1959, Ser. No. 833,062
1 Claim. (Cl. 230—69)

The present invention relates to blower apparatus and, more particularly, to electrostatic apparatus for moving air or gas through conduits at low-noise levels.

In certain applications, such as in the ventilation systems of ships, a compact, noiseless, and static type blower for moving ventilating air or gases through the system is desirable. Heretofore, known ventilating systems in common use in ships employed large fans for propelling the air or gases through the ventilating ducts. Manifestly, the fans employed in these systems have an objectionable high noise level. It is an object of the present invention to produce a blower apparatus for ventilation systems which is capable of substantially noiseless operation, of small size, light in weight, and may be easily and economically manufactured.

According to one embodiment of this invention, the blower apparatus comprises an elongate conduit having an air inlet and an air outlet, at least one corona discharge electrode disposed within said conduit in the region of the air inlet, and field electrode means disposed along the conduit for establishing a voltage gradient between the corona discharge electrode and the field electrode means resulting in an electrostatic field which progressively increases in strength between the discharge electrode and the field electrode means in a direction away from the discharge electrode, whereby a corona discharge from said discharge electrode creates an electric wind through said conduit to thereby effect a net increase in the velocity of the air through the apparatus.

Other objects and advantages of this invention will be manifested from the following detailed description of several embodiments of the invention when considered in light of the drawings wherein the same reference numerals are used throughout to designate similar elements:

FIGURE 3 is a diagrammatic illustration of the blower apparatus illustrated in FIGURE 1 having a pulse type energizing circuit; and FIGURE 4 is a sectional view of a modified form of the invention wherein two corona discharge electrodes are employed and energized by a voltage divider network.

Figure 1:
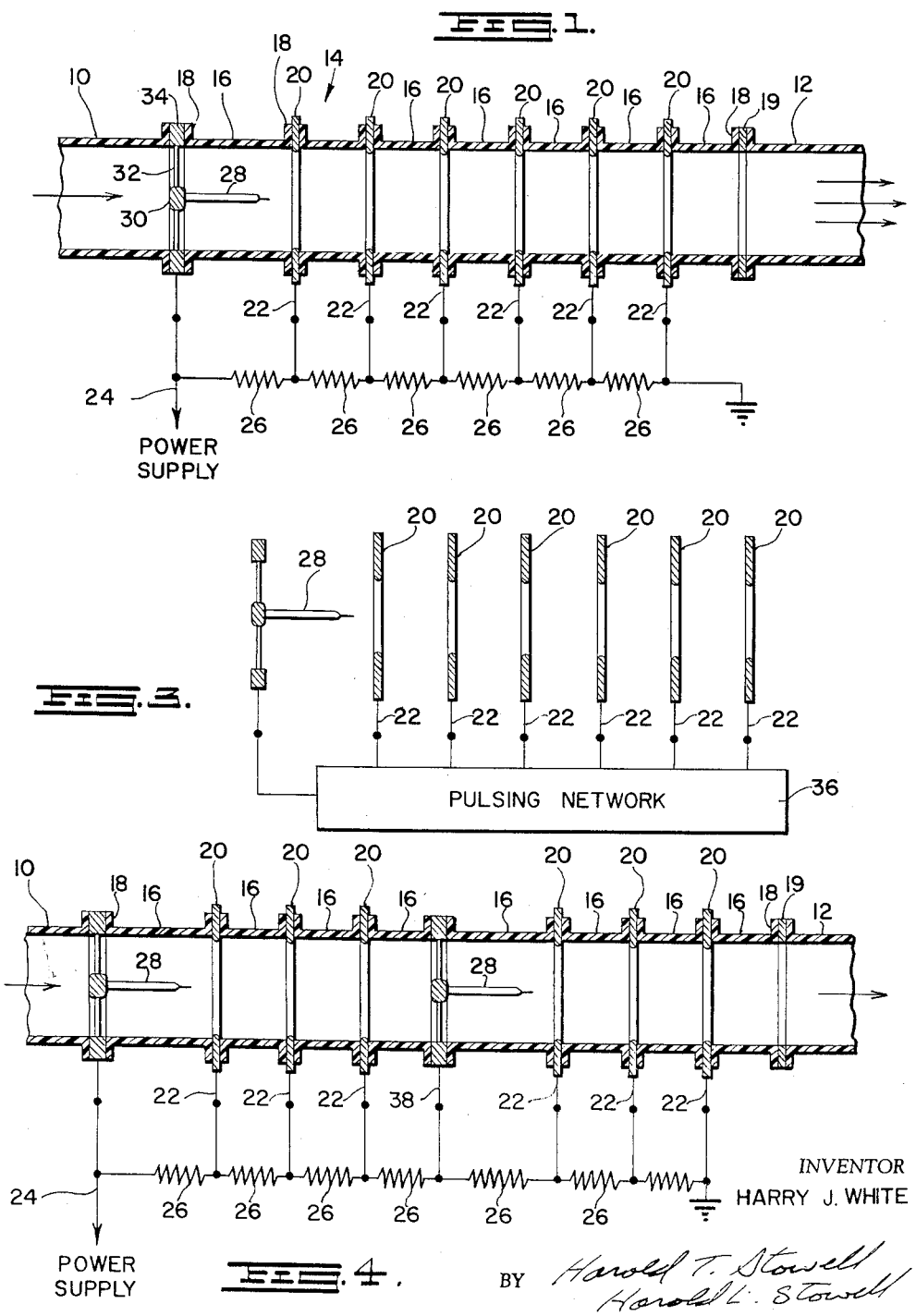
FIGURE 1 is a sectional view of an embodiment of the electrostatic blower apparatus of the invention employing a voltage dividing energizing network.

Referring to FIGURE 1 of the drawings, there is shown a typical air ventilation system having an inlet conduit 10 and an outlet conduit 12. Between the conduits 10 and 12 is disposed the blower apparatus 14 of the present invention which comprises a plurality of adjacent cylindrical tube elements 16 formed of any suitable dielectric material such as Bakelite, Plexiglas, and the like. The opposite ends of each of the tube elements 16 are provided with outwardly flared annular flange portions 18. Annular shaped field focusing electrodes 20 are disposed between adjacent end portions 18 of the tube elements 16. The field electrodes 20 are made of any suitable electrically conductive material and each is provided with an electrically conductive input wire 22 which is coupled to a power supply through a resistance voltage divider network and a conductor 24. The resistance voltage divider network is comprised of a plurality of series connected resistors 26 and is capable of maintaining the potentials on the individual field electrodes 20 at given predetermined values.

The outlet conduit 12 is secured to the flanged portion 18 of the last of the cylindrical tube elements 16. To insure an air-tight connection, a gasket 19 may be satisfactorily employed between the outlet conduit 12 and the tube element 16 to which it is secured.

At the inlet end of the blower apparatus 14, there is a corona point discharge electrode 28 which is mounted coaxially within one of the cylindrical tube elements 16 and is rigidly supported therein by a spider member. The spider member is comprised of a central hub 30, integral with the corona electrode 28, and has radial arms 32 which extend outwardly to an annular portion 34. It will be noted that the annular portion 34 of the spider member is disposed between the flared ends of the air inlet conduit 10 and the first of the series of cylindrical tube elements 16. The hub 30 and the radial arms 32 are of streamlined design so as to not impede the flow of air and also to militate against any spurious electric discharge.

The spider member is formed of any suitable electrically conductive material having sufficient mechanical strength to properly locate and maintain the corona discharge electrode 28 coaxially within the cylindrical conduit or passageway formed by the series of cylindrical tube elements 16.

In operation of an embodiment of the apparatus wherein there are six field electrodes 20, the corona electrodes 28 and the field electrodes 20 are maintained at predetermined values by means of a resistance voltage divider network. The resistance voltage divider network is comprised of a series of resistors 26 connected at one end through the conductor 24 to a source of potential of typically —60 kv., which is fed directly to the corona electrode 28, and the other end is maintained at ground or zero volts so as to establish a 10 kv. gradient between the corona electrode 28 and the first field electrode 20 and each pair of electrodes thereafter, resulting in an electrostatic field which progressively increases in strength between the corona electrode 28 and the successively more remote field electrodes 20. By virtue of the electric field established in the region of the corona electrode 28, a field of intense ionization is produced in the region of the pointed end of the electrode due to the ionic collisions with molecules of air or gas entering the blower apparatus 14 through the inlet conduit 10. This ionization results in the formation of a large number of small ions. Ions of molecular size and of the same polarity of charge as the point of the corona electrode 28 will be repelled therefrom with an increased velocity. In general, the focusing field electrodes 20 will maintain an electric field which is disposed generally parallel to the axis of the cylindrical tube formed by the individual tube elements 16 of the apparatus 14. Corona ions from the point of the electrode 28 will then tend to travel parallel with the tube axis and thereby provide the greatest wind effect. These ionic currents thus set up are of sufficient intensity and volume to drag a considerable amount of air with them so as to form what is known as "electric wind" which flows generally from the inlet conduit 10 to the outlet conduit 12 along the axis and through the blower apparatus 14 as illustrated by the arrows in FIGURE 1.

An alternate operational arrangement of the system is achieved by grounding only the field electrode 20 which is farthest removed from the corona electrode 28. The intermediate field electrodes 20 then take on intermediate potentials determined by the corona discharge from the point of the electrode 28. In effect, the focusing of such an arrangement becomes semiautomatic and provides potential distribution highly favorable for the production of electric wind.

It has been found that full-wave rectified alternating current and direct current energization of the blower apparatus of the present invention were capable of producing higher air velocities than half-wave rectified current. It has also been noted that a long, tapered point configuration for the electrode 28 resulted in air velocities superior to those achieved by a short, tapered point configuration of the electrode.

Figure 2:
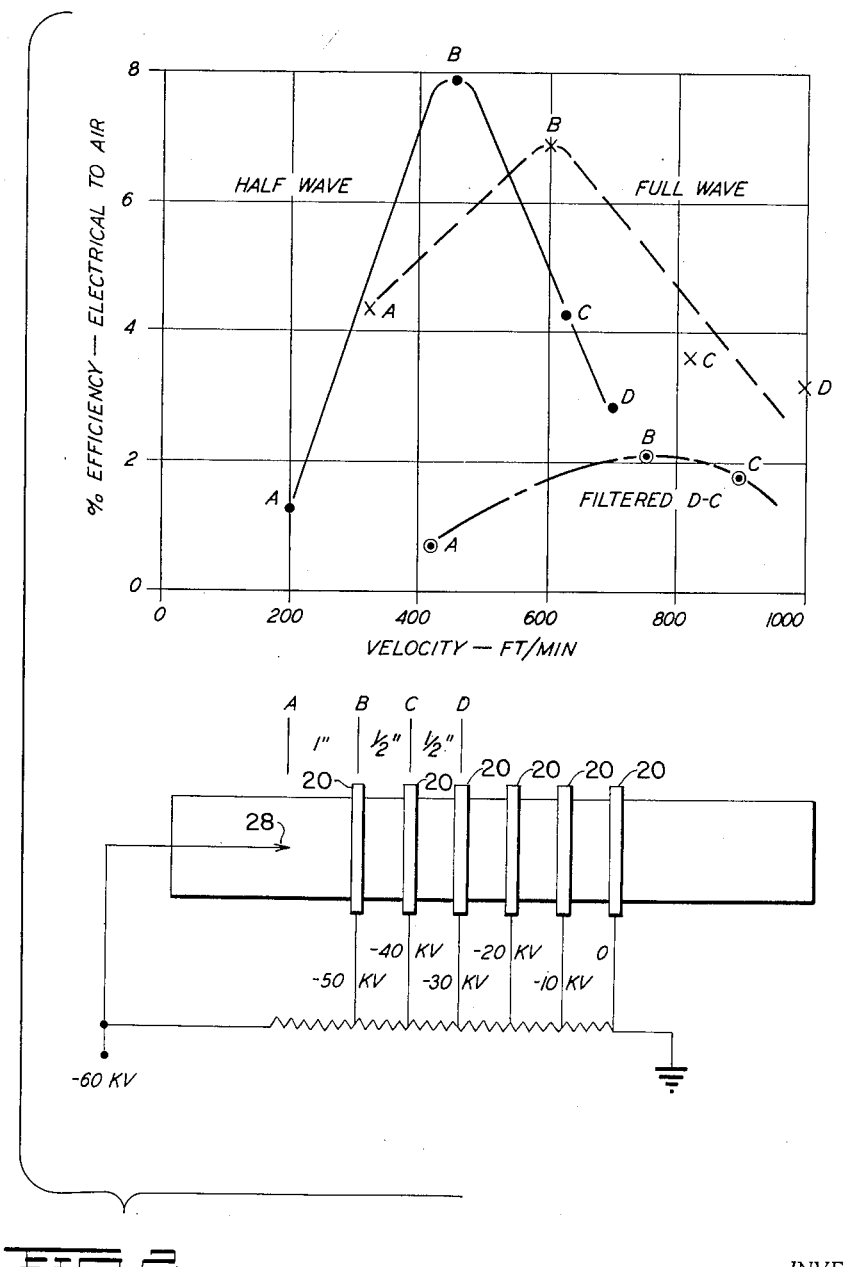
FIGURE 2 is a graphic illustration of the operation of the apparatus shown in FIGURE 1 illustrating the electrical to air efficiency and the velocity achieved for various types of energization and dispositions of the corona discharge electrode.

Further, the disposition of the point end of the electrode 28, as well as the type of energization, has an effect on the resultant air velocities and energy conversion efficiencies. In actual tests, using Plexiglas for the cylindrical tube elements 16 and forming them of such dimensions to achieve a ½-inch separation between adjacent field electrodes 20, the resultant air velocities and energy conversion efficiencies shown on the graph in FIGURE 2 were achieved with the corona electrode 28 maintained at −60 kv. and the potential on the field electrodes 20 decreasing in negative potential by 10 kv., with the farthest removed electrode 20 at ground or zero volts potential. From an examination of FIGURE 2, it will be seen that with the use of filtered D.C. energization and/or full-wave energization, the apparatus is capable of producing air velocities in excess of 900 feet per minute.

A variation of the arrangement of the apparatus shown in FIGURE 1, is shown in FIGURE 3 wherein the focusing field electrodes 20 are maintained static or are energized by D.C. potential, and the corona electrode 28 is pulsed by a pulsing network 36. In the arrangement shown in FIGURE 3, the corona electrode 28 is pulsed in such a manner that the corona occurs intermittently in the form of rather short, but intense pulses. For example, a pulse frequency of the order of 60 to 120 pulses per second may be used to conform with the ordinary A.C. line frequency, and a pulse duration of the order of 100 to 1,000 microseconds. In such an arrangement as shown in FIGURE 3, a voltage pulse may be caused to progress down the passive electrode system, that is, the field electrodes 20 by electrically energizing these electrodes in timed sequence. This results in a voltage wave effect which produces corona from the corona electrode 28 for short intervals. The pulse of corona ions will then travel along the electrode system at a velocity determined by the field and by the velocity of the voltage pulse. If the axial field has a strength of $E_0$ volts/cm. and the ion mobility is K cm./second per volt/cm., the ion velocity will be $$V = KE_0$$

The advantages of the pulse scheme are principally that high fields can be produced without the necessity of using excessively high voltages. For example, only 60 kv. maximum is required for the pulse arrangement. To achieve the same fields, with the steady state or D.C. voltage, would require on the order of 240 kv.

An alternate pulse scheme or arrangement is to pulse the corona electrode 28 while energizing the passive electrode system with direct current. This is simpler as far as the pulser network is concerned, but requires higher voltages on the passive electrode system.

FIGURE 4 shows modification of the apparatus disclosed in FIGURE 1 wherein a second corona electrode 28' is inserted downstream from the corresponding corona electrode 28 at the input of the blower apparatus. The corona electrode 28' is structurally identical with the corona electrode 28 and is electrically coupled to the resistance voltage divider network through an electrical conductor 38. In operation, the electrode 28' is maintained at a lower potential than the corona electrode 28 by virtue of being connected to the resistance voltage divider network at or near its midpoint. In such an arrangement, the second corona electrode 28' is adapted to discharge only on the downstream side.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than specifically illustrated and described.

I claim:

An electrostatic blower apparatus comprising an elongate annular conduit having a gas inlet and a gas outlet, said conduit including a plurality of annular field electrodes spaced apart by coaxially disposed annular insulating spacer elements, a corona discharge electrode means, means for supporting said corona discharge electrode means within said conduit in the region of the gas inlet, and a source of electrical energy coupled to said electrodes, said source of electrical energy including a pulsing network for applying a voltage pulse to said electrodes of sufficient potential to effect corona discharge therefrom and maintaining a potential on said field electrodes which increases with respect to the potential applied to said corona discharge electrode in a direction from the gas inlet toward the gas outlet of said conduit whereby the ions generated by the ionizing discharge from the corona discharge electrode are caused to travel from said corona discharge electrode means toward the gas outlet of said conduit thereby effecting an air flow through said conduit from the gas inlet to the gas outlet thereof.

References Cited in the file of this patent

UNITED STATES PATENTS

| 2,182,751 | Reitherman | Dec. 5, 1939 |
| 2,279,586 | Bennett | Apr. 14, 1942 |
| 2,460,175 | Hergenrother | Jan. 25, 1949 |
| 2,525,347 | Gilman | Oct. 10, 1950 |
| 2,636,664 | Hertzler | Apr. 28, 1953 |
| 2,765,975 | Lindenblad | Oct. 9, 1956 |
| 2,791,371 | Foster et al. | May 7, 1957 |

FOREIGN PATENTS

| 262,829 | Great Britain | Feb. 16, 1928 |